United States Patent
Bilinovich

(10) Patent No.: US 7,314,406 B2
(45) Date of Patent: Jan. 1, 2008

(54) TREE HOIST SYSTEM

(76) Inventor: Brian M. Bilinovich, 18268 Warwick Rd., Marshallville, OH (US) 44645

( * ) Notice: Subject to any disclaimer, the term of this patent is extended or adjusted under 35 U.S.C. 154(b) by 434 days.

(21) Appl. No.: 10/906,758

(22) Filed: Mar. 4, 2005

(65) Prior Publication Data

US 2006/0196435 A1    Sep. 7, 2006

(51) Int. Cl.
*A22C 15/00* (2006.01)
(52) U.S. Cl. .................................. 452/185
(58) Field of Classification Search ........ 212/175–177, 212/179, 180, 294; 452/185
See application file for complete search history.

(56) References Cited

U.S. PATENT DOCUMENTS

| | | | | |
|---|---|---|---|---|
| 2,384,939 | A * | 9/1945 | Lord | 182/103 |
| 2,628,071 | A * | 2/1953 | Williams | 254/409 |
| 3,902,700 | A * | 9/1975 | Cox | 182/102 |
| 4,598,795 | A * | 7/1986 | Larson | 182/129 |
| 4,787,476 | A | 11/1988 | Lee | |
| 4,945,859 | A | 8/1990 | Churchwell | |
| 5,040,635 | A | 8/1991 | Strickland | |
| 5,427,356 | A * | 6/1995 | Krotov et al. | 254/324 |
| 5,454,445 | A | 10/1995 | Berryman | |
| 5,562,534 | A * | 10/1996 | McGough | 452/187 |
| 5,655,623 | A | 8/1997 | Skyba | |
| 5,794,563 | A | 8/1998 | Klepac | |
| 5,806,626 | A | 9/1998 | Jenkins, Jr. | |
| 5,862,777 | A | 1/1999 | Sweeney | |
| 6,045,442 | A * | 4/2000 | Bounds | 452/187 |
| 6,082,300 | A | 7/2000 | Futch | |
| 6,089,431 | A | 7/2000 | Heyworth | |
| 6,109,855 | A | 8/2000 | Vela-Cuellar | |
| 6,170,609 | B1 | 1/2001 | Dech | |
| 6,305,320 | B1 | 10/2001 | Fore | |
| 6,334,508 | B1 * | 1/2002 | Shields | 182/116 |
| 6,557,598 | B2 | 5/2003 | Glover et al. | |
| D477,440 | S | 7/2003 | Ansaldo | |
| 6,684,812 | B1 | 2/2004 | Tucker | |
| 6,695,688 | B1 | 2/2004 | Owen et al. | |
| 6,719,093 | B2 * | 4/2004 | Garbs | 182/116 |
| 6,739,964 | B2 * | 5/2004 | Gearhart | 452/187 |
| 6,994,618 | B1 * | 2/2006 | Syers | 452/187 |
| 7,163,082 | B2 * | 1/2007 | Bigard | 182/100 |
| 7,168,521 | B1 * | 1/2007 | Murray | 182/127 |

OTHER PUBLICATIONS

Sweeney Enterprises, Inc., "Wildlife Feeders (http://www.sweeneyfeeders.com/cgi-bin/sf/prod_wildlife.html)," printed from the Internet, 2 pages, (Apr. 6, 2004).

(Continued)

*Primary Examiner*—Thomas Price
(74) *Attorney, Agent, or Firm*—Hahn Loeser & Parks, LLP; W. Edward Crooks

(57) ABSTRACT

A tree hoist system is provided utilizing a mast having a plurality of steps to allow the upper portion of the mast to be secured to a tree without requiring a ladder. The tree hoist system includes a cable and brake winch to lock or raise/lower an attached game feeder or gambrel. The tree hoist system can be transported, assembled, and disassembled, quickly and easily by a single person. The tree hoist blends into the environment with a minimum profile that blends with a tree to which it is attached.

20 Claims, 10 Drawing Sheets

OTHER PUBLICATIONS

Spin-Cast Wildlife Feeders of Texas, "Feed Containers (http://www.spincastfeeders.com/feed.html)," printed from the Internet, 5 pages, (Apr. 6, 2004).

Monarch Hunting Products, "Feeder Hoist (http://www.deerfeeder.com/Feeder%20Hoist.htm)," printed from the Internet, 2 pages, (Jan. 4, 2005).

Cabela's, "Game Feeders (http://www.cabelas.com/cabelas/en/templates/index/index-display.jhtml?id=cat600362&nav...)," printed from the Internet, 2 pages, (Jan. 4, 2005).

Cabela's, "Expandable Feeder (http://www.cabelas.com/cabelas/en/templates/product/standard-item.jhtml?id=00284832267...)," printed from the Internet, 1 page, (Jan. 4, 2005).

Cabela's, "E-Z Load Game Feeder (http://www.cabelas.com/cabelas/en/templates/product/standard-item.jhtml?id=00307382271...)," printed from the Internet, 1 page, (Jan. 4, 2005).

Cabela's, "Feeder Tripod (http://www.cabelas.com/cabelas/en/templates/product/standard-item.jhtml?id=00055422220...)," printed from the Internet, 1 page, (Jan. 4, 2005).

Cabela's, "Monarch Game Hitch (http://www.cabelas.com/cabelas/en/templates/links/link.jhtml?id=0016701225604a&type=p...)," printed from the Internet, 1 page, (Jan. 4, 2005).

Custom Wildlife Feeders, "Feeders for Deer, Turkey, Quail, and Small Game (http://home.triad.rr.com/cwfnctemp/Shaun%20Liddle)," printed from the Internet, 2 pages, (Jan. 5, 2005).

Advanced Hunting Equipment, Inc., "Instructions for using your Tree Winch portable deer hoist (http://www.treewinch.com/instructions_for_using_your_tree.htm)," printed from the Internet, 11 pages, (Mar. 4, 2005).

Scottybsports, "New Tree Mount Deer Feeder Turkey w Timer 200lb (http://cgi.ebay.com/ws/eBayISAPI.dll?ViewItem&category=383&item-7150355887&rd=1)," printed from the Internet, 5 pages, (Apr. 19, 2005).

* cited by examiner

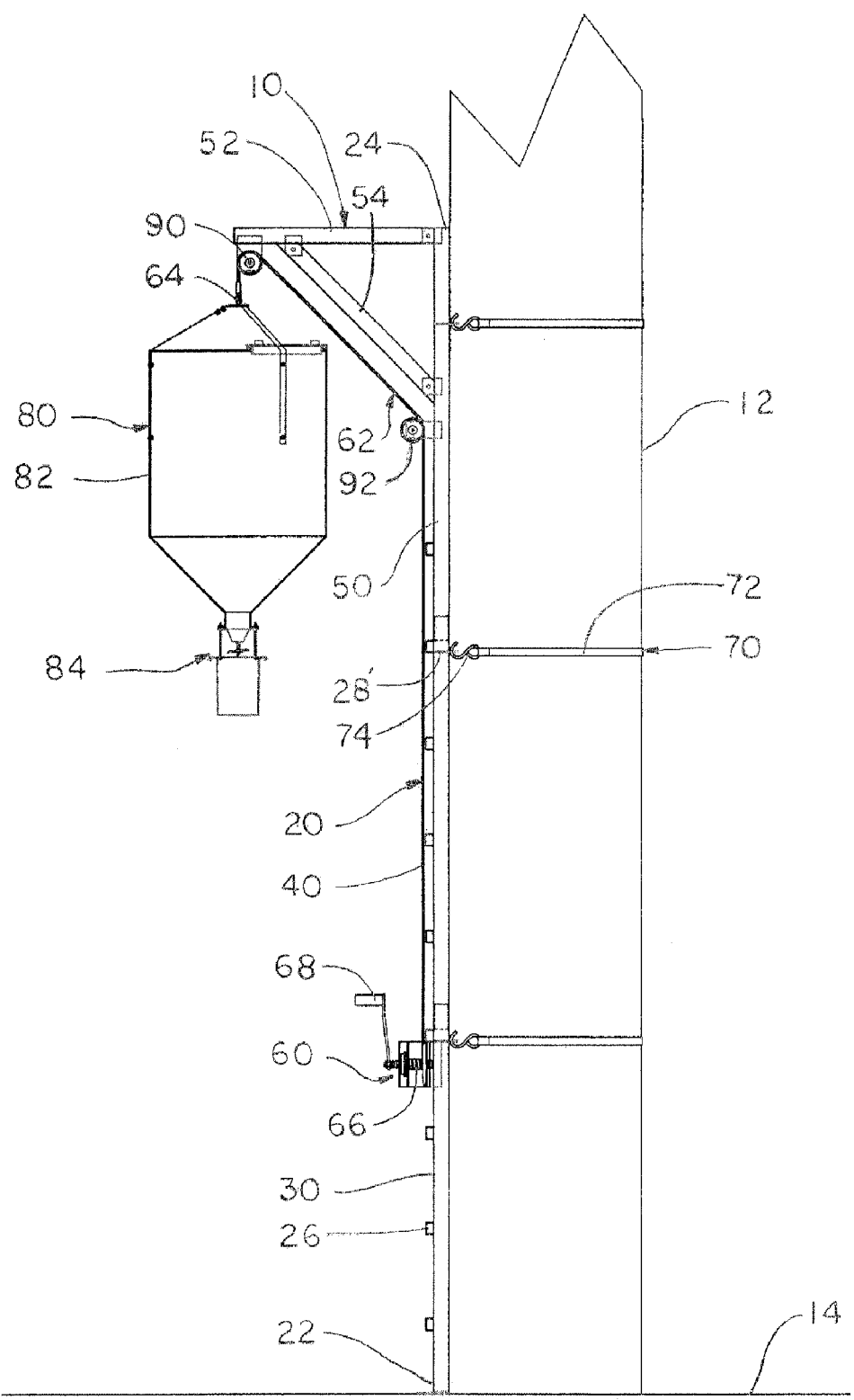

TREE HOIST SYSTEM

TECHNICAL FIELD

The present invention relates to a tree hoist system and method for setting up the tree hoist system, and more particularly, to a portable tree hoist system transportable by a single person and is assembled and attachable to a tree or pole by a single person and a method for attaching the tree hoist system to a tree. The tree hoist system utilizes a mast having a plurality of steps to help the user attach the top of the mast to the tree and a brake winch and cable to allow the user to raise and lower a game feeder or a gambrel.

BACKGROUND OF THE INVENTION

Deer or game feeders are useful in managing animal populations and attracting wildlife for observation or hunting. During times when natural food sources are scarce, such as during a severe winter or a population boom, it is difficult for a herd of deer, or other animals, to find adequate food. Shortage of food can cause the deer to move to a different territory, or, where that is not possible, the shortage can result in a malnourished deer population. A malnourished deer population is undesirable for various reasons, but is especially troublesome in areas where the deer are hunted because malnutrition results in poor quality meat and poorly developed antlers. Game managers hoping to draw and hold deer on their property can do so by making feed for the deer readily available utilizing game feeders to supplement their natural diet. There are many different game feeder systems that have been developed.

Currently, the most popular game feeders are simply tripods supporting a barrel style feeder. Wild animals are very sensitive to new and strange items appearing in their habitat. Although a game feeder contains and disperses feed for the wild animals, its presence can disturb animals' natural habits and even frighten them away. The tripod barrel style feeders, and many other prior art feeders, are difficult to camouflage because their design requires a large structure that is deployed out in the open and does not blend in with animals' natural habitat.

Another problem with tripod style feeders is that they are susceptible to being knocked over by very strong winds or by large animals. Some users have attempted to solve this problem by driving stakes into the ground through the base of the tripod poles. Although an improvement, when the ground is wet, the stakes can be easily pulled from the ground.

Game feeders are generally supported a considerable height above the ground. Although this prevents the deer from taking feed at will from the feed dispensing means, it also makes filling the feeder considerably difficult. In order to fill game feeders, ladders are often used to gain access to the top of the feeder. Sometimes a vehicle is placed close to the feeder so that the user can climb on the vehicle. Both of these methods are inconvenient, and can also be dangerous.

Prior art feeders are expensive. However, they are typically deployed in remote areas that are unmonitored which, combined with their high visibility, makes them an easy target to be stolen. Another problem with prior art feeders is that they typically require multiple people to set them up.

Several prior art feeders utilize a pole that is secured in the ground by concrete, and the feeder is mounted above the top of the pole. These fixed pole type feeders are expensive, difficult to set up, especially in remote areas having uneven terrain, and take extensive set up time. The fixed pole type feeders are essentially fixed in these locations permanently. Continuous use in a single location causes the ground to be destroyed beneath the feeder due to animals tracking beneath the feeder (cattle effect) and uneaten feed rotting. If the feeder is near any trees, the roots can be exposed in this location, damaging or killing the trees. Another disadvantage of fixed pole type feeders is that the feeder must be kept seven to twelve feet above the ground, resulting in a large structure that is difficult to camouflage. Fixed pole feeders on long poles are also difficult to fill with feed because of their height above the ground.

Game hoists are generally used with a gambrel to hoist an animal carcass into the air to a position where it can be skinned and processed. Several prior art hoists are designed to be attached to a tree. A problem with these hoists is that they are attached to the tree at the maximum reach of the user. While this may be an adequate height for smaller game, larger game often drags on the ground, or is not positioned at a comfortable working height. In addition, the low height mounting of the prior art game hoists prevents them from being used to support a game feeder. This limits the use of the game hoist to hunting season and only at times when the hunt is successful.

SUMMARY OF THE INVENTION

The present invention overcomes at least one of the problems identified in the prior art by providing a hoist system attachable to a tree, the system comprising a longitudinal mast having a first end and a second end, a means for attaching the mast to the tree, a plurality of steps attached transversely to the longitudinal mast, a boom member attached transversely to the second end of the mast, a winch attached to the longitudinal mast between the first end of the mast and the second end of the mast, a cable having a first end and a second end, the second end operably attached to the winch, the cable movably supported by the boom member such that the first end of the cable is movable toward or away from the boom member.

The present invention further provides a method for setting up a hoist system comprising the steps of a) providing a tree hoist comprising a longitudinal mast having a first end and a second end, a plurality of steps attached transversely to the longitudinal mast, a boom member attached to the second end of the mast, a winch attached to the mast between the first and second ends of the mast and a cable having a first end and a second end wherein the second end is operably attached to the winch and the cable is moveably supported by the boom member; b) positioning the second end of the mast adjacent the base of a tree; c) pivoting the mast toward the tree such that the mast contacts the tree in at least one location and the boom member extends outwardly away from the tree; d) attaching the mast to the tree using at least one strap accessible from the ground; e) climbing the mast using the plurality of steps; f) attaching the mast to the tree using at least one strap generally near the first end of the mast; g) attaching the first end of the cable to a game feeder or a gambrel; and h) elevating the game feeder or gambrel to a position near the first end of the mast using the winch.

These and other advantages will be apparent upon review of the drawings and the detailed description of the invention.

BRIEF DESCRIPTION OF THE DRAWINGS

The invention will now be described in further detail with reference to the accompanying drawings, in which:

FIG. 1 is a side elevational view of the tree hoist system of the present invention attached to a tree and supporting a game feeder;

DETAILED DESCRIPTION OF THE DRAWINGS

Figure 2:
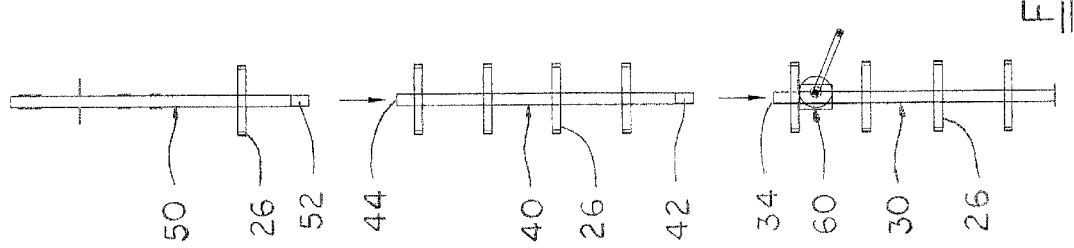
FIG. 2 is an exploded front view an embodiment of the mast of the tree hoist system with the brake winch attached to the bottom section of the mast.
Figure 5:
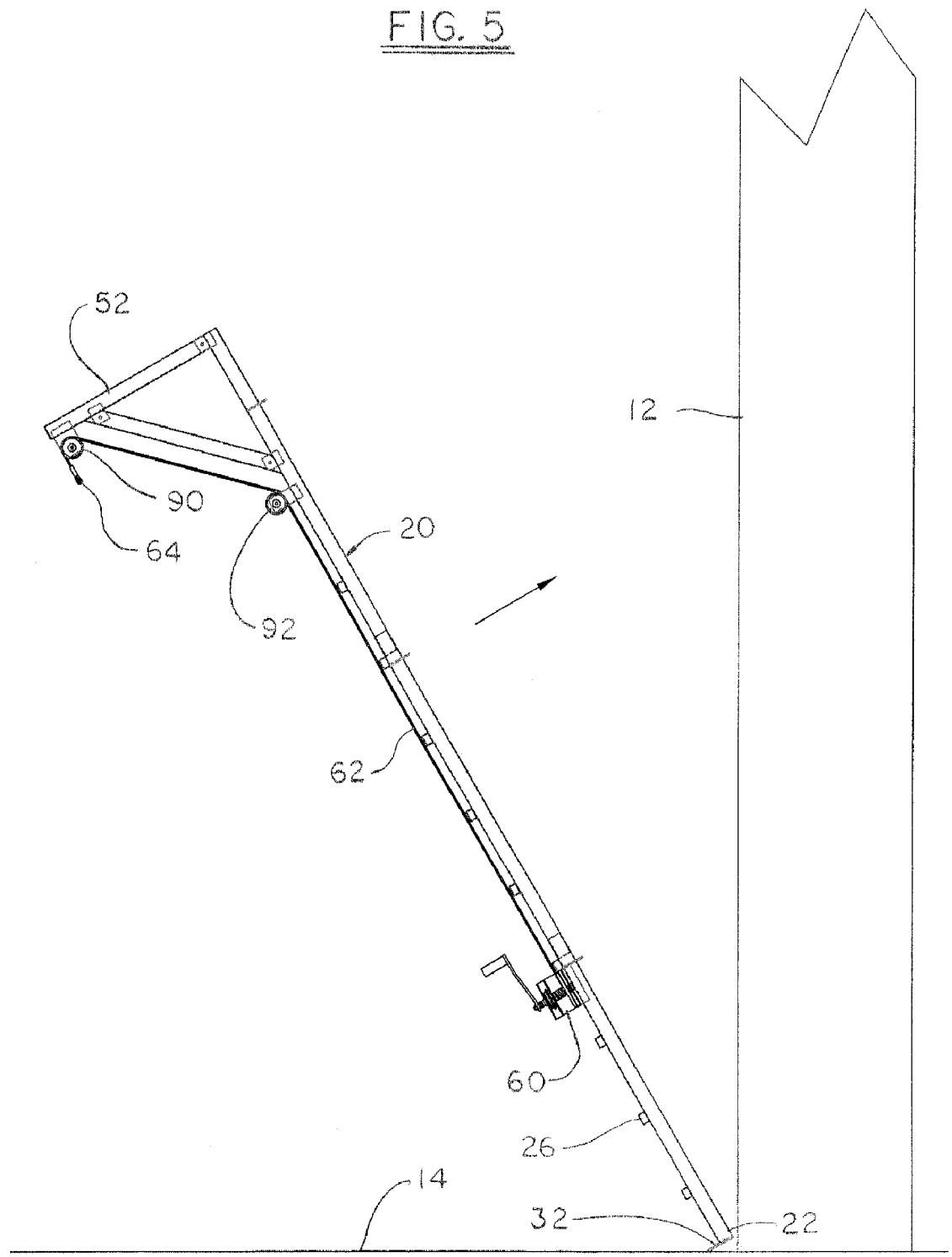
FIG. 5 is a side elevational view of the tree hoist system being pivoted toward a tree.

Referring to FIG. 1, a tree hoist system 10 of the present invention is shown attached to a tree 12. The tree hoist system 10 comprises a longitudinal mast 20 having a first end 22 and a second end 24, and a plurality of steps 26 attached transversely to the mast in a spaced apart relationship as best shown in FIG. 2. The longitudinal mast 20 comprises a plurality of sections 30, 40, 50, positioned end-to-end to form the mast 20. A top section 50 of the mast includes a boom member 52 transversely attached to the second end 24 of the mast 20. A support leg 54 is attached at one end to the boom member 52 and at the other end to the mast 20. A bottom section 30 of the mast 20 has a brake winch 60 attached thereto. The tree hoist system 10 further comprises a means 70 for attaching at least one section of the mast 20 to the tree 12 shown herein as straps 72 having hooks 74 on either end and secured to rings 28 attached to each side of the mast 20. While the term "strap" may be used herein, it is contemplated that the term "strap" includes any equivalent means to attach the mast to a tree or pole including, but not limited to, cables, chains, fabric, rope, rubber, polymers, all of which may include fastening devices such as hooks, d-rings, or the like as well as tensioning systems to tighten them such as winches or buckles. The tree hoist system 10 may include a game feeder 80. The game feeder 80 comprises a feed storage container 82 and a feed dispersal device 84 and is attached to a first end 64 of a cable 62. The cable is supported by a pulley wheel 90 attached to the boom member 52 and by a pulley wheel 92 attached to the mast 20. The second end 66 of cable 62 is operably attached to the brake winch 60 such that an operator can raise and lower the game feeder 80 by turning a hand crank 68 of the brake winch 60.

The method of setting up the tree hoist system of the present invention is best shown progressively through FIGS. 3-10, with the final configuration represented by FIGS. 1 (game feeder) and 11 (gambrel). The tree hoist system 10 can be carried by a single person to a remote location inaccessible to a truck and assembled and disassembled by a single person.

Figure 4:
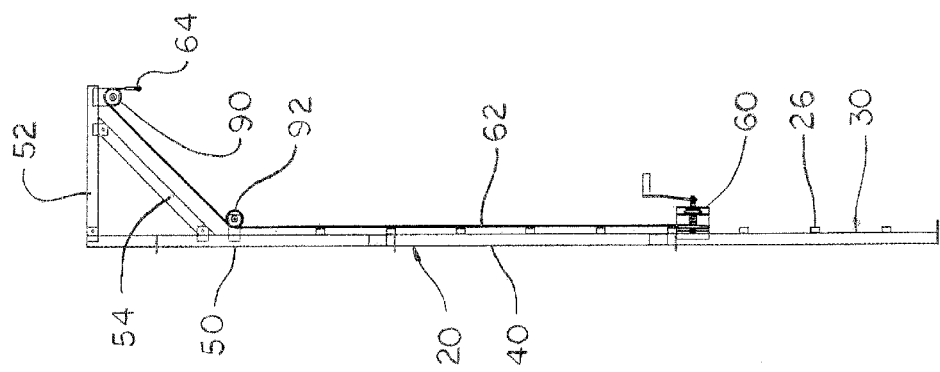
FIG. 4 is a side elevational view of the tree hoist system.
Figure 3:
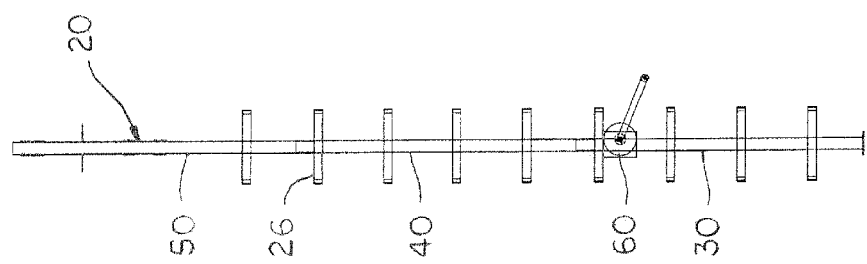
FIG. 3 is a front view of the assembled mast.

Referring now to FIG. 3, the bottom section 30, middle section 40, and top section 50 are shown disassembled. The disassembled sections 30, 40, 50 are easily carried by the user to a remote tree hoist location adjacent a tree 12. The sections 30, 40, 50 of mast 20 all include at least one step 26 attached transversely thereto. Each step 26 extends outwardly and transversely from the mast 20 in at least one direction. When each step 26 extends from the mast 20 in one direction, the steps 26 are staggered such that adjacent steps 26 extend in opposite directions from the mast 20 (not shown). As shown, each step 26 extends from the mast 20 in two directions such that a user can stand on a single step 26 with both feet. The mast 20 and steps 26 are typically manufactured of a square or round tubular steel, and powder coated and painted. The powder coat and paint protect the steel from corrosion from the weather. The paint may be a camouflage or bark color to help the mast blend in with the surroundings. However, the present invention is not intended to be limited to a particular material or coating. A brake winch 60 is shown attached to the bottom section. The sections 30, 40, 50 can be attached to each other by any known means including bolting, threads, hinges, pins, tubing plugs, etc. As shown in FIG. 3, top section 50 and middle section 40 have staged ends 42, 52, respectively, fitting into the ends of tubular ends 34, 44, respectively.

Once the user has reached the remote tree hoist location adjacent a tree 12, the mast 20 is assembled. As the mast 20 is typically ten to fourteen feet long, the mast 20 is most easily assembled horizontally on the ground 14. The mast 20 is shown connected in FIGS. 4 and 5. The cable 62 has been extended from the brake winch 60 and is positioned around pulley wheels 90 and 92 such that the first end 64 of the cable is adjacent pulley wheel 90. Once the mast 20 is assembled and the cable 62 positioned, the mast 20 is pivoted about its first end 22 to an upright position adjacent the base of the tree 12. The first end 22 of the mast 20 includes a base plate 32 attached thereto to provide support for the tree hoist system 10 by distributing the supported weight over a larger area and preventing the first end 22 of the mast 20 from plunging into the ground 14.

Figure 6:
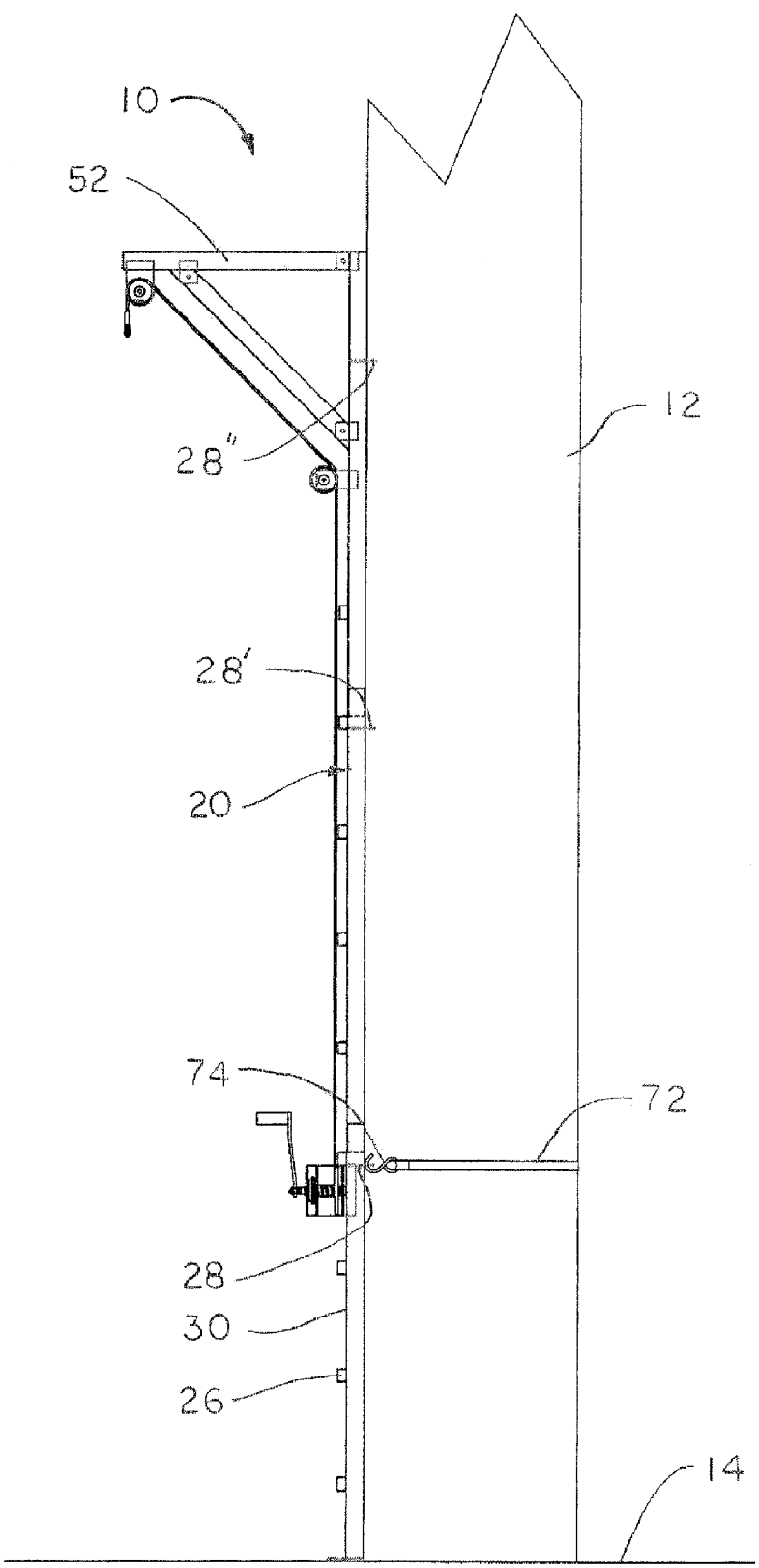
FIG. 6 is a side elevational view of the tree hoist system with the bottom section of the mast secured to a tree.
Figure 7:
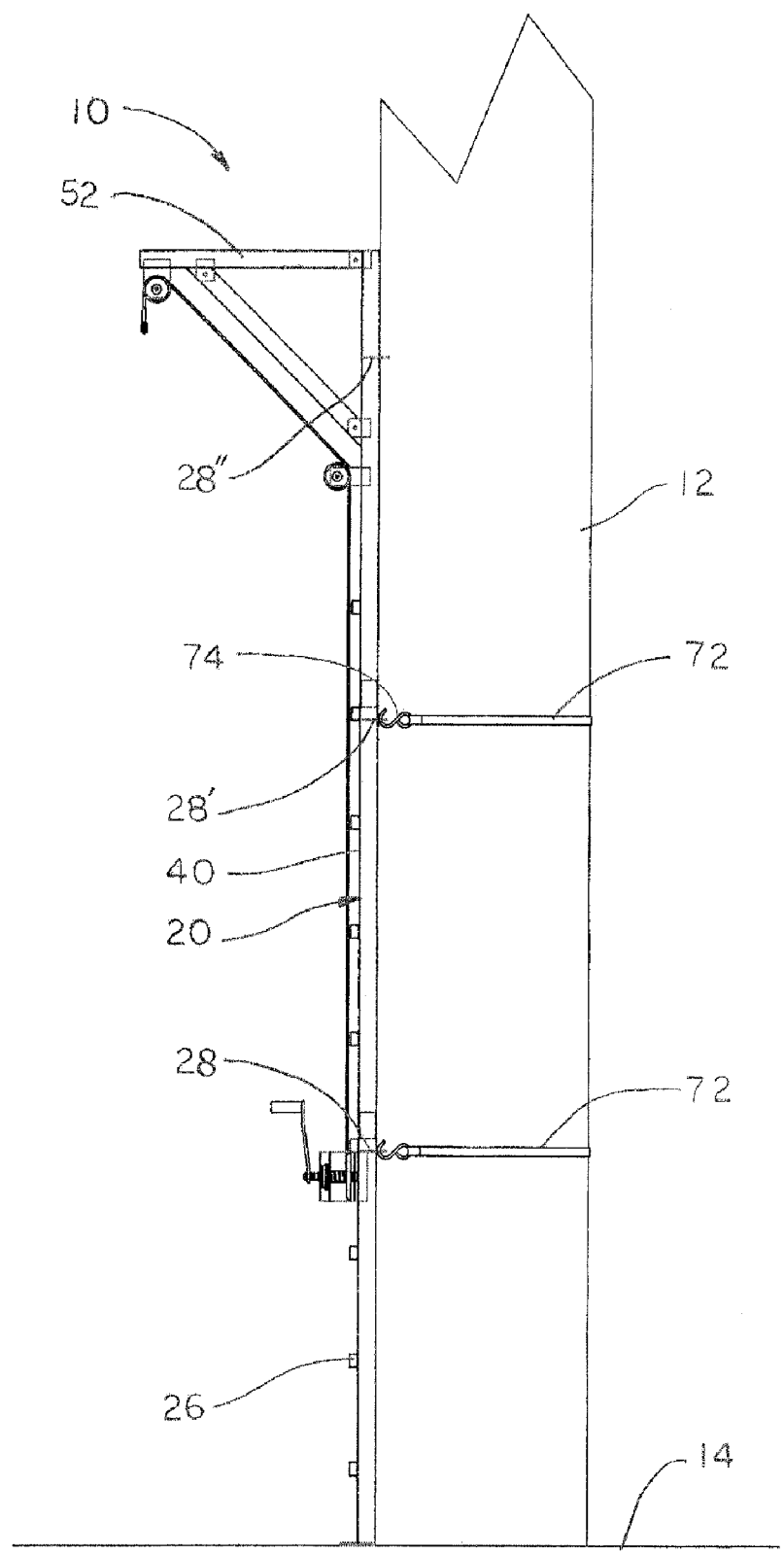
FIG. 7 is a side elevational view of the tree hoist system with the bottom and middle sections of the mast secured to a tree.
Figure 8:
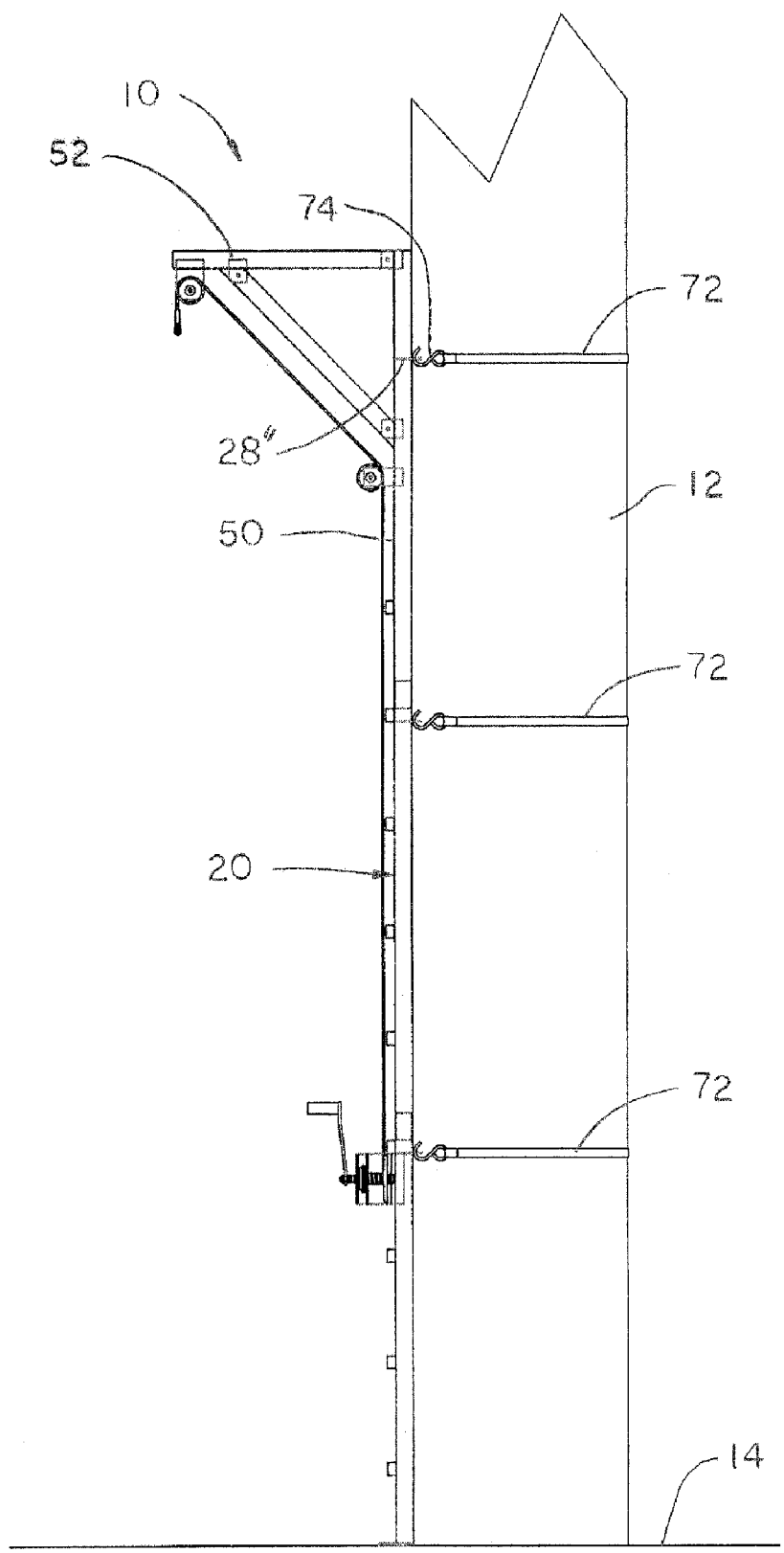
FIG. 8 is a side elevational view of the tree hoist system the mast secured to a tree.

Once the mast 20 is adjacent the tree 12, the mast is secured sequentially to the tree as shown in FIGS. 6-8. Referring now to FIG. 6, the bottom section 30 of the mast is secured to the tree 12 with straps 72 by attaching hooks 74 to rings 28 attached to each side of the mast 20. The second attachment location 28' is typically seven to nine feet off the ground 14 and the third attachment location 28" is typically ten to thirteen feet off the ground 14, depending on the total height of the mast 20. This makes it difficult or impossible for a person of average height to secure the middle section and the top section by standing on the ground 14. With the present invention, once the bottom section 30 is secure, the user can climb the mast 20 using the steps 26 to be able to secure the middle section 40 of the mast 20 to the tree 12 as shown in FIG. 7, and then climb up further to secure the top section 50 of the mast 20 to the tree 12 as shown in FIG. 8. It is noted that the mast 20 could also be attached to the tree by other means 70 as previously mentioned. In places where security is an issue, a lock and chain or cable is used to secure the mast to the tree (not shown) to prevent the unauthorized removal of the tree hoist system 10. The locking chain is typically used near the boom member 52 however any position or multiple positions along the mast 20 is contemplated.

Figure 9:
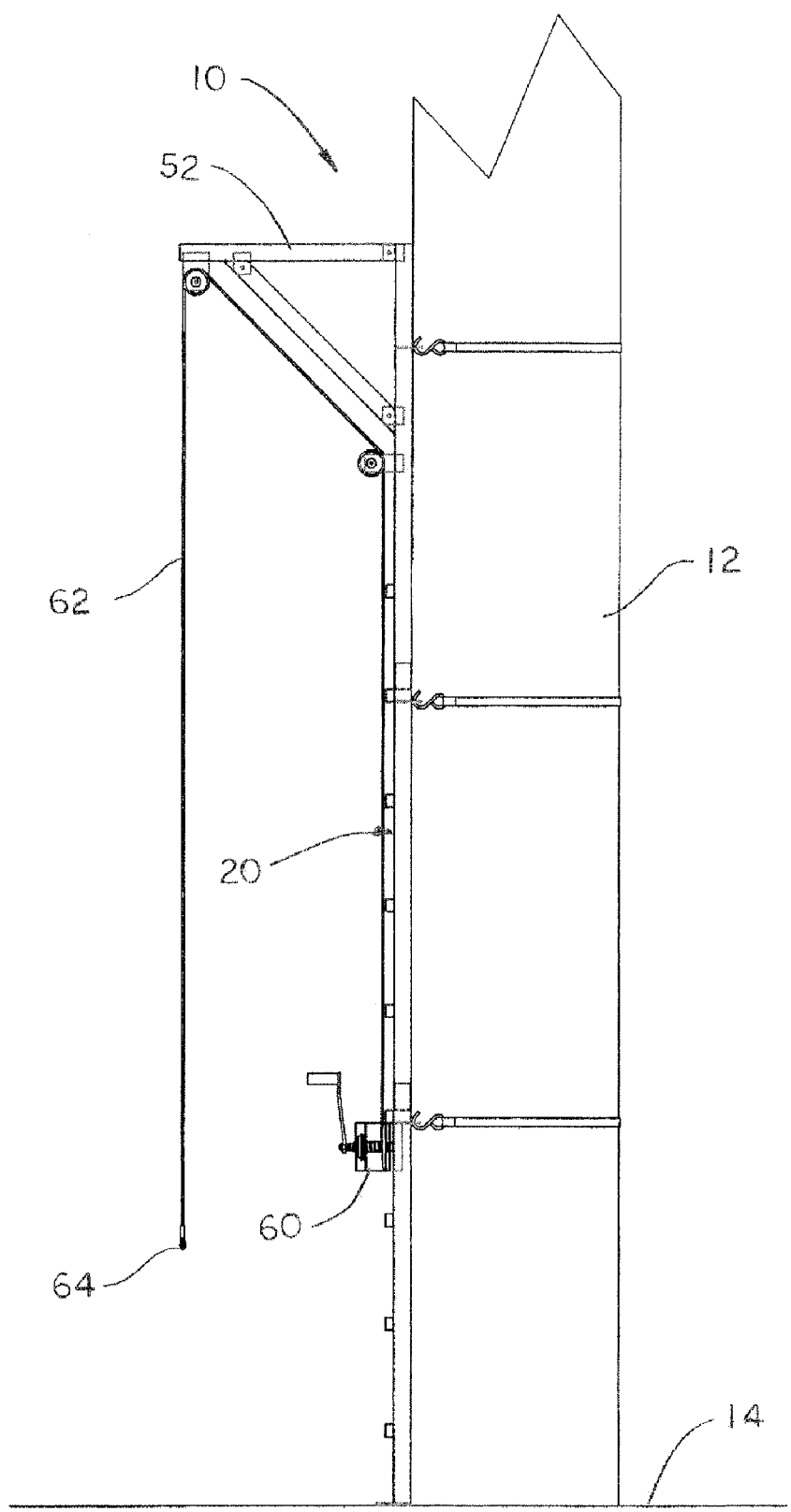
FIG. 9 is a side elevational view of the tree hoist system with the cable lowered toward the ground.
Figure 10:
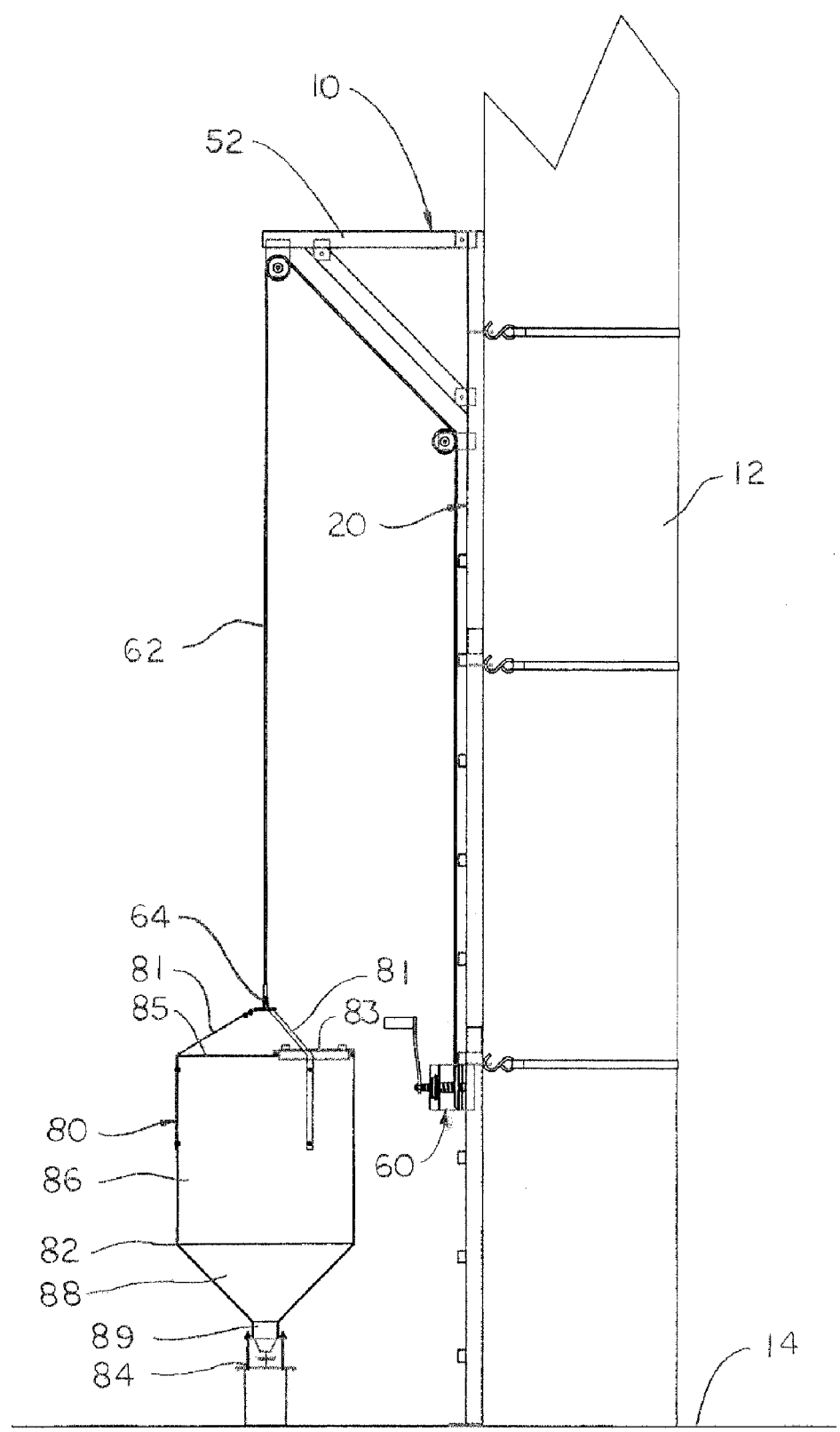
FIG. 10 is a side elevational view of the tree hoist system with the feeder attached to the cable.

Referring now to FIG. 9, with the mast 20 secured to the tree 12, the first end 64 of cable 62 is lowered toward the ground 14 using brake winch 60. The game feeder 80 is then attached to the first end 64 of the cable 62 utilizing a cable attachment support bracket 81 attached to the feed storage container 82 as shown in FIG. 10. The game feeder 80 may be of any configuration that is adapted to store and disperse feed. The feed storage container 82 shown is a cylindrical container 86 having a frusto-conical portion 88 at the bottom of the cylindrical section to direct feed toward a cylindrical outlet 89. The container 82 does not have sharp corners that will allow feed to be trapped in the container where it can rot and ruin the feed. The feed container 82 is water tight to protect the feed. The container 82 is made of strong plastic or an aluminum material that is lightweight, yet strong enough to hold two hundred to three hundred pounds of feed. However, the present invention is not limited to a particular shape or material for the feed storage container and any shape and material suitable for the feed storage device could be used, such as a steel sheet material and/or a square shaped box with a frusto-pyramidal bottom. The feed container 82 is painted camouflage or green to help the container 82 blend in with the surroundings. The feed dispersal device 84 is attached to the bottom of the feed storage container 82. Feed dispersal devices 82 are well known and commercially available. The devices are typically battery operated and come with a variety of features such as programmable feed times, durations, remote controls, daylight sensors, etc. The feed is dispersed by a rotating feed plate that slings the feed onto the ground 14 at predetermined intervals. The feed dispersal unit 84 is typically attached to the feed storage container 82 at set-up of the tree hoist system, although it can be pre-attached as shown.

Once the game feeder 80 is attached to the cable 62, the brake winch 60 is used to lift the game feeder 80 off the ground 14 such that it is supported by the cable 62. Once suspended, the brake winch 60 is locked to hold the cable 62 in position. The feed storage container 82 of the game feeder 80 can then be filled with feed by the user by utilizing the fill opening 83 at the top 85 of the container 82. Typical feed includes shelled corn. Filling the container 82, when elevated a short distance off the ground 14, helps hold the container steady, keeps the weight of the container and feed off of the feed dispersal unit 84, and prevents feed from spilling out during jostling of the container. Once filling is complete, the fill opening 83 is then closed and the filled game feeder 80 is then elevated into position, as shown in FIG. 1, and the brake winch 60 locks the cable 62 in position. The tree hoist system 10 is then ready for use. The preprogrammed feed dispersal unit 84 will then automatically disperse the feed in accordance with its instructions. It has been determined that a single person can set up the tree hoist system 10 of the present invention, as shown FIG. 1, in fifteen minutes or less.

When the game feeder 80 is low or out of feed, the user can return to the remote site with additional feed. The game feeder 80 is lowered toward the ground 14 and locked at a height conducive to refilling the feed container 82. The feed is then poured into an opening of the feed container. Once the container 82 is refilled, the opening is closed and the brake winch 60 is used to raise and lock the game feeder into its operational height adjacent the top section 50 of the mast 20 as shown in FIG. 1.

Figure 11:
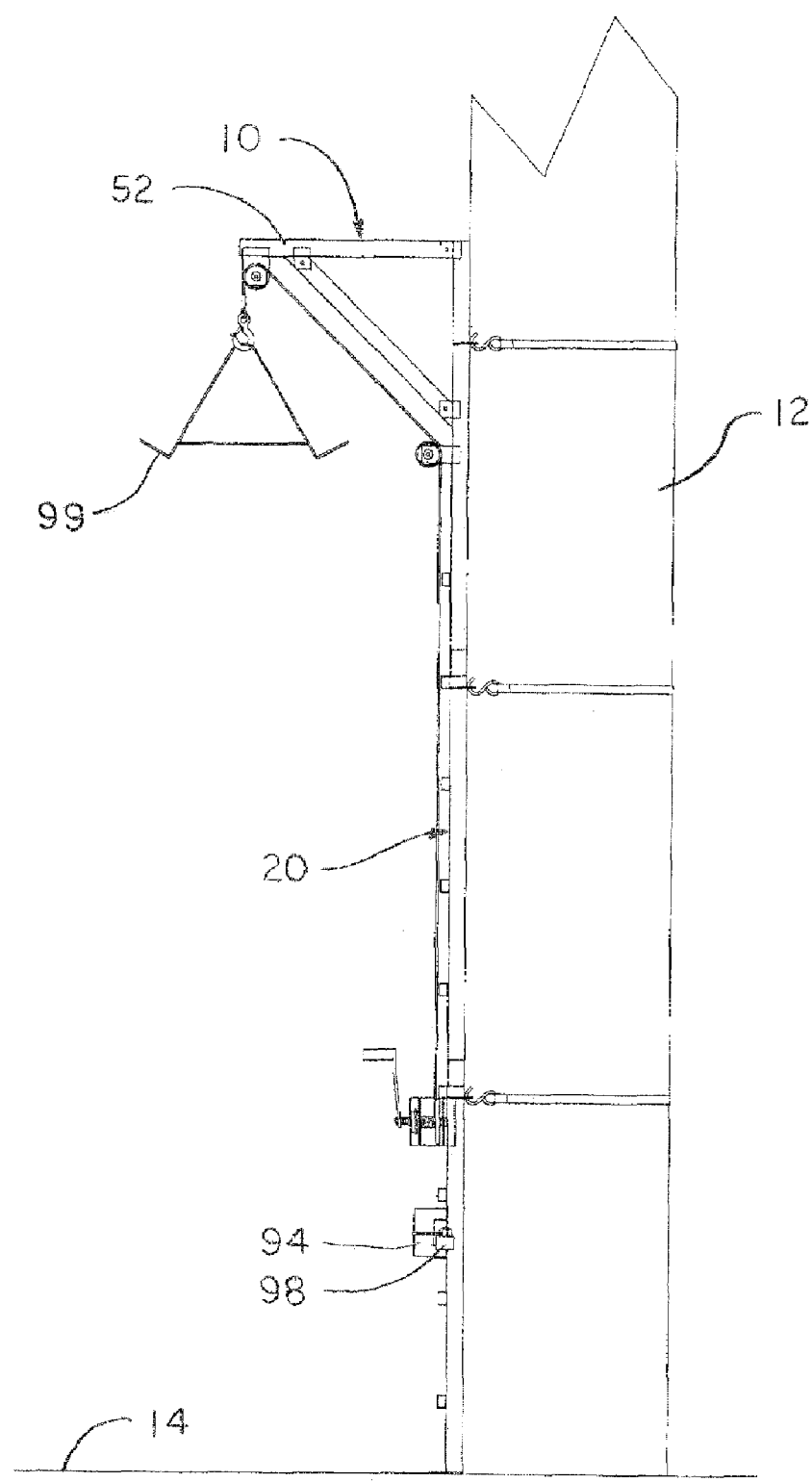
FIG. 11 is a front view of the tree hoist system with the mast secured to a tree and a gambrel attached to the cable.

Game feeders are often not deployed for long periods of time. The tree hoist system 10 of the present invention is removed as easily as it is set up by reversing the steps shown in FIGS. 2-10 as discussed above. The tree hoist system 10 can also be used with a gambrel 99 instead of the deer feeder 80 as shown in FIG. 11. The height of the hoist system 10 allows an animal carcass to be elevated at any height suitable to the user to provide a comfortable working level.

Figure 12:
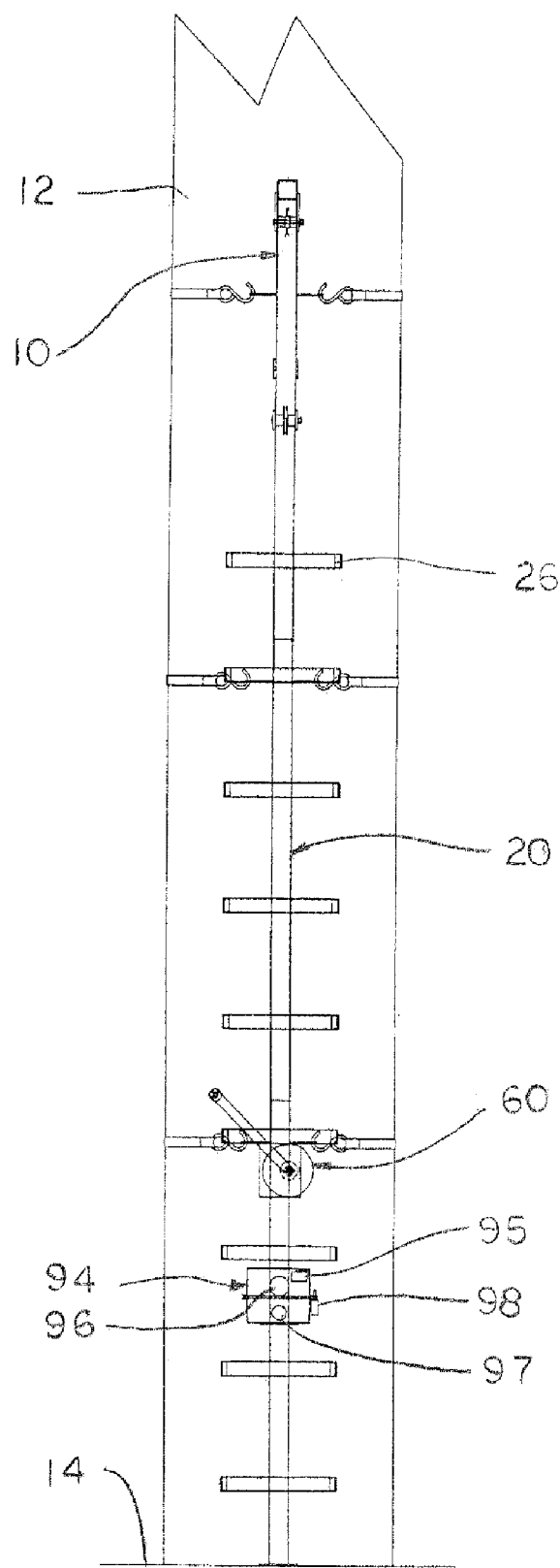
FIG. 12 is a front view of the tree hoist system with the mast secured to a tree and a scouting camera attached to the mast.

Another embodiment of the invention is shown in FIGS. 11 and 12 where a game camera, also referred to as a scouting camera 94, is shown attached to the mast 20 of the tree hoist system 10. A scouting camera 94 is a camera system that utilizes a flash 95, a camera 96, digital or film, and a sensor 97 utilizing an infrared beam. When the beam is broken, such as by a passing deer, the camera is triggered and the picture taken. Scouting cameras are used by game managers to provide accurate data regarding the game population in a certain area of land. With regard to deer, for example, a scouting camera can be used to help determine a region's deer population and buck-to-doe ratios, and they also help the game managers develop a better understanding of migration routes and migration timing. However, game cameras are typically mounted to a tree using screws or a strap that make mounting and positioning the camera difficult. The tree hoist system 10 provides a secure mounting location for the scouting camera 94 that can be locked to the mast 20 by lock 98 as shown.

The tree hoist system 10 of the present invention is transportable, assembled, and disassembled, quickly and easily. The tree hoist 10 blends into the environment with a minimum profile that blends with a tree to which it is attached. The tree hoist system 10 has built in steps 26 to allow the upper portion of the mast to be secured to the tree without requiring a ladder. The tree hoist system 10 includes a brake winch 60 to lock or move a game feeder 80 between an operational position adjacent the top section 50 of the mast 20 and a feed loading position adjacent the bottom section 30 of the mast 20. The tree hoist system 10 does not require a separate support pole that must be permanently positioned in the ground. Another advantage is that the tree hoist system 10 is not suspended directly from a tree branch that may damage or break the tree limb.

Although the present invention and the advantages provided have been described above in detail, the same is by way of illustration and example only and is not to be taken as a limitation on the present invention. It is understood that many variations of the illustrated invention are possible without departing from the scope of the present invention. Accordingly, the scope and content of the present invention are to be defined only by the terms of the appended claims.

What is claimed is:

1. A hoist system attachable to a tree, the system comprising:
   a longitudinal mast having a first end and a second end;
   a means for attaching the mast to the tree;
   a plurality of steps attached transversely to the longitudinal mast;
   a longitudinal boom member attached to and extending transversely from the second end of the mast;
   a winch attached to the longitudinal mast between the first end of the mast and the second end of the mast;
   a cable having a first end and a second end, the second end operably attached to the winch, the cable movably supported by the boom member such that the first end of the cable is movable toward or away from the boom member.

2. The hoist system of claim 1, wherein the mast comprises a plurality of sections that are attachable to each other, end-to-end to form the mast.

3. The hoist system of claim 2, wherein the plurality of sections comprises at least a top section and a bottom section of the mast.

4. The hoist system of claim 3, wherein the winch is attached to the bottom section of the mast.

5. The hoist system of claim 3, wherein the plurality of sections of the mast further comprises a middle section between the top section and the bottom section of the mast.

6. The hoist system of claim 1, wherein the means for attaching the mast to the tree composes a rope, a nylon strap, a ratchet strap, or a chain.

7. The hoist system of claim 1, wherein each step extends outwardly and transversely from the mast in at least one direction.

8. The hoist system of claim 1 further comprising a first pulley wheel attached to the boom member and a second pulley wheel attached to the top section of the mast to movably support the cable.

9. The hoist system of claim 1 further comprising a scouting camera attached to the mast.

10. The hoist system of claim 1 further comprising a base plate attached to the first end of the mast.

11. The hoist system of claim 10, wherein the base plate supports a portion of the weight supported by the tree hoist.

12. The hoist system of claim 1 further comprising a game feeder attached to the first end of the cable.

13. The hoist system of claim 1 further comprising a gambrel attached to the first end of the cable.

14. A hoist system attachable to a tree, the system comprising:
- a longitudinal mast having a first end and a second end, the longitudinal mast comprising a plurality of sections positioned end to end to form the mast, the plurality of sections including at least a bottom section and a top section;
- a means for attaching each section of the mast to the tree;
- a longitudinal boom member attached transversely to the second end of the mast and configured to extend away from the tree when the mast is attached to the tree;
- a winch attached to the bottom section of the mast;
- a cable having a first end and a second end, the first end attached to a game feeder or a gambrel, the second end operably attached to the winch to raise or lower the game feeder or the gambrel.

15. The hoist system of claim 14, wherein plurality of sections further comprises a middle section between the top and bottom section of the mast.

16. The hoist system of claim 14, wherein the middle section and the bottom section of the mast comprise a plurality of steps transversely attached the middle section and the bottom section of the mast.

17. The hoist system of claim 14 further comprising a scouting camera attached to the mast.

18. A method for setting up a hoist system comprising the steps of:
- providing a tree hoist comprising a longitudinal mast having a first end and a second end, a plurality of steps attached transversely to the longitudinal mast, a boom member attached to the second end of the mast, a winch attached to the mast between the first and second ends of the mast and a cable having a first end and a second end wherein the second end is operably attached to the winch and the cable is moveably supported by the boom member;
- positioning the second end of the mast adjacent the base of a tree;
- pivoting the mast toward the tree such that the mast contacts the tree in at least one location and the boom member extends outwardly away from the tree;
- attaching the mast to the tree using at least one strap accessible from the ground;
- climbing the mast using the plurality of steps;
- attaching the mast to the tree using at least one strap generally near the first end of the mast;
- attaching the first end of the cable to a game feeder or a gambrel; and
- elevating the game feeder or gambrel to a position near the first end of the mast using the winch.

19. The method of claim 18 further comprising the steps of assembling the mast from a plurality of sections including at least a bottom section and a top section.

20. The method of claim 18 further comprising the step of lowering the first end of the cable toward the second end of the mast prior to the step of attaching the first end of the cable to the feed storage container or gambrel.

* * * * *